United States Patent [19]
Martin et al.

[11] Patent Number: 5,715,856
[45] Date of Patent: Feb. 10, 1998

[54] LIQUID FLOW CONTROL APPARATUS

[76] Inventors: Tommy Martin, 183 Reed Creek School Rd., Hartwell, Ga. 30643; John Dawkins, 15 Scott Close, Woodley, Reading, Berks, England, RG54UP

[21] Appl. No.: 620,458

[22] Filed: Mar. 22, 1996

[51] Int. Cl.⁶ .................. A01J 5/00; A01J 5/01; F16K 31/24; F16K 33/00
[52] U.S. Cl. .......... 137/205; 119/14.34; 137/391; 137/406; 137/408; 137/423; 137/425; 137/430; 141/198; 222/68; 222/152; 417/126; 417/127; 417/138
[58] Field of Search .................. 137/202, 205, 137/397, 406, 407, 408, 423, 425, 188, 189, 192, 403, 453, 454, 430, 433; 141/198; 119/14.02, 14.25, 14.32, 14.34, 14.35; 222/67, 68, 69, 152; 417/126, 127, 137, 138

[56] References Cited

U.S. PATENT DOCUMENTS

| | | | |
|---|---|---|---|
| 1,139,744 | 5/1915 | Zeratsky | 119/14.32 |
| 1,164,256 | 12/1915 | Cameron | 119/14.18 |
| 1,216,992 | 2/1917 | Hawley | 417/127 |
| 1,277,684 | 9/1918 | Berg | 417/127 |
| 1,294,521 | 2/1919 | Muzzy | 417/126 |
| 1,304,313 | 5/1919 | Higginson et al. | 417/126 |
| 1,327,112 | 1/1920 | Nicholson et al. | 222/68 |
| 1,360,027 | 11/1920 | Rockwell | 417/127 |
| 1,582,302 | 4/1926 | Peter | 222/68 |
| 1,716,371 | 6/1929 | Dienner | 417/127 |
| 2,463,995 | 3/1949 | Nielsen | 222/67 |
| 2,667,990 | 2/1954 | Mojoinnier | 222/67 |
| 2,715,488 | 8/1955 | Conlon | 226/32 |
| 2,987,065 | 6/1961 | Bender | 137/205 |
| 3,028,875 | 4/1962 | Alguire | 137/391 |
| 3,211,171 | 10/1965 | Kinsey | 137/205 |
| 3,224,460 | 12/1965 | Cann, III | 137/205 |
| 3,469,596 | 9/1969 | Branton | 137/205 |
| 4,198,999 | 4/1980 | Boudreau | 137/205 |
| 4,295,490 | 10/1981 | Boudreau | 137/595 |
| 4,429,809 | 2/1984 | Bousgarbies | 222/67 |
| 4,712,595 | 12/1987 | Wilson | 141/201 |
| 4,823,830 | 4/1989 | Bucker | 137/205 |
| 5,284,180 | 2/1994 | Guo et al. | 137/488 |
| 5,445,193 | 8/1995 | Koeninger et al. | 141/18 |

*Primary Examiner*—George L. Walton
*Attorney, Agent, or Firm*—Bernstein & Assoc.

[57] ABSTRACT

A liquid flow control apparatus (5) suitable for handling milk from a milking machine, comprising a first chamber (10) that comprises an inlet (11) for the milk, an outlet (12) for connecting to a vacuum pump, and an outlet (14) for the milk to flow by gravity to a second chamber (13). The first chamber (10) and the second chamber (13) are in communication with each other by means of the outlet (14) at the bottom of the first chamber (10). The second chamber (13) has a float valve (23) that closes off communication between the first chamber (10) and the second chamber (13) depending on the level of liquid in the second chamber (13). A conduit tube (18) for air communication is disposed between the first chamber (10) and the second chamber (13). A second float valve (17b) closes off communication via the conduit tube (18) between the two chambers. A third chamber (21) has two valves with one valve (26) opening to the atmosphere and a second valve (20) opening to the second chamber (13). The second chamber (13) also has an outlet (15) with a counterweighted flapper valve (16) for opening and closing the outlet (15). The valves cooperate in response to rising or falling fluid levels to close or open associated chambers, thus creating a mechanism for moving fluid under reduced pressure through the apparatus (5).

18 Claims, 8 Drawing Sheets

FIG.1

LIQUID FLOW CONTROL APPARATUS

BACKGROUND OF THE INVENTION

I. Field of the Invention

The present invention relates to liquid flow control apparatus, and more particularly to a liquid flow control apparatus for handling milk.

II. Background of the Art

In a commercial dairy operation, a milking machine is typically used to milk a cow. The milking machine utilizes a vacuum that is created by a pressure differential to express milk from the teats on the cow. The expressed milk is transferred by the reduced pressure first to an inspection vessel and then to a collecting vessel. The milk is extracted from the collecting vessel by means of a pump and fed to a refrigerated milk storage tank. From the refrigerated milk storage tank, the milk is distributed for processing.

The disadvantage of such a system is that in order to extract the milk from the collecting vessel, the pump must be capable of operating against the reduced pressure in the collecting vessel. As a result, pumps and controls which introduce maintenance, down time, contamination, use of electricity, and additional cost to the system are required. Also, the use of a pump to transfer the milk from the collecting vessel to the refrigerated tank increases the chance of having lypolysis or separation problems. Accordingly, there is a need for a collecting vessel for a milking operation that does not require a pump to extract liquid therefrom.

SUMMARY OF THE INVENTION

Generally described, the present invention provides a liquid flow control apparatus for a collecting vessel. The collecting vessel of the present invention accepts milk under reduced pressure, yet does not require a pump to extract the milk therefrom.

In a preferred embodiment, the present invention comprises a liquid flow control apparatus having a first chamber that comprises an inlet for the milk, an outlet for connecting to a vacuum pump, and an outlet for the milk to flow by gravity to a second chamber. The first and second chambers are in communication with each other by means of the outlet at the bottom of the first chamber. The second chamber has a first float valve that closes off communication between the first and second chamber depending on the level of liquid in the second chamber. The invention also comprises a conduit tube for air transfer from the second chamber to the first chamber. A second float valve closes off communication via the conduit tube between the two chambers. A third chamber has two valves with a first poppet valve opening to the atmosphere and a second poppet valve opening to the second chamber. The second chamber also has an outlet with a counter weighted flapper valve for opening and closing the outlet.

In operation, the vacuum pump creates a reduced pressure zone in the first and second chambers which causes milk to flow into the second chamber through the first chamber. The vacuum created inside the second chamber holds the flapper valve shut, and the milk begins to fill up the chamber. As the level of the milk rises in the second chamber, the milk lilts the second float valve which seals off the conduit tube. Also, the second float valve opens the second poppet valve to the third chamber by means of an arm. At this point, the third chamber is subjected to the same pressure as the first two chambers, and the second chamber is still at reduced pressure and connected to the first chamber via the first float valve orifice. Liquid continues to flow from the first chamber into the second chamber.

As the level of milk continues to rise, the milk lifts the first float valve until the float seals off the opening between the first and second chamber. At this point the first and second chambers have their communication completely closed off as the conduit tube and the opening between the chambers is sealed off by the two float valves. Also, an arm extending from the first float valve opens the first poppet valve in the third chamber which opens the third chamber to the atmosphere. With the third chamber open to the atmosphere and the second chamber in communication with the third chamber, the weight of the milk causes the flapper valve at the outlet of the second chamber to open which allows the milk to flow freely to a refrigerated milk storage tank. The first float valve that closes off the opening between the first and second chamber does not fall because of the vacuum that is being drawn on the first chamber. When the level of milk in the chamber falls to a given level the second float valve no longer closes off the conduit tube between the first and second chamber because the weight of the float counteracts the force of the pressure differential on the float at the inlet of the conduit tube, and the opening between the second and third chamber is closed off.

When all of the milk that was in the second chamber passes through the outlet, the flapper valve closes due to the counterweight, and the pressure in the second chamber begins to drop as air is withdrawn from the chamber through the conduit. Once the pressure in the second chamber is reduced to that of the first chamber, the first float valve that closes the opening between the first and second chambers returns to the open position. At this stage the milk in the first chamber is free to flow through the opening to the second chamber and the process is ready to start again.

Accordingly, it is an object of the present invention to provide a liquid flow control apparatus for a collecting vessel that receives milk under reduced pressure from a normal vacuum system used for milking, and yet does not require a pump to extract milk therefrom.

It is another object of the present invention to provide a simple device for transferring milk from one vessel under reduced pressure to another at atmospheric pressure after the milking procedure has taken place.

It is yet another object of the present invention to reduce the energy requirements associated with the milking process.

It is a further object of the present invention to provide a liquid flow control apparatus that can reduce the cost of the milking operation by eliminating the need for a pump to overcome the reduced pressure inside the collecting vessel in order to extract milk therefrom.

It is yet an additional object of the present invention to provide a liquid flow control apparatus comprising a first chamber having a liquid inlet and an outlet so that the first chamber may be subjected to a pressure which is less than atmospheric pressure; a second chamber in communication with the first chamber, and having an outlet; and valve means for closing communication between the first and second chambers when a predetermined quantity of liquid has flowed from the first chamber to the second chamber and for connecting the second chamber to atmosphere so that the liquid can flow through the outlet of the second chamber.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
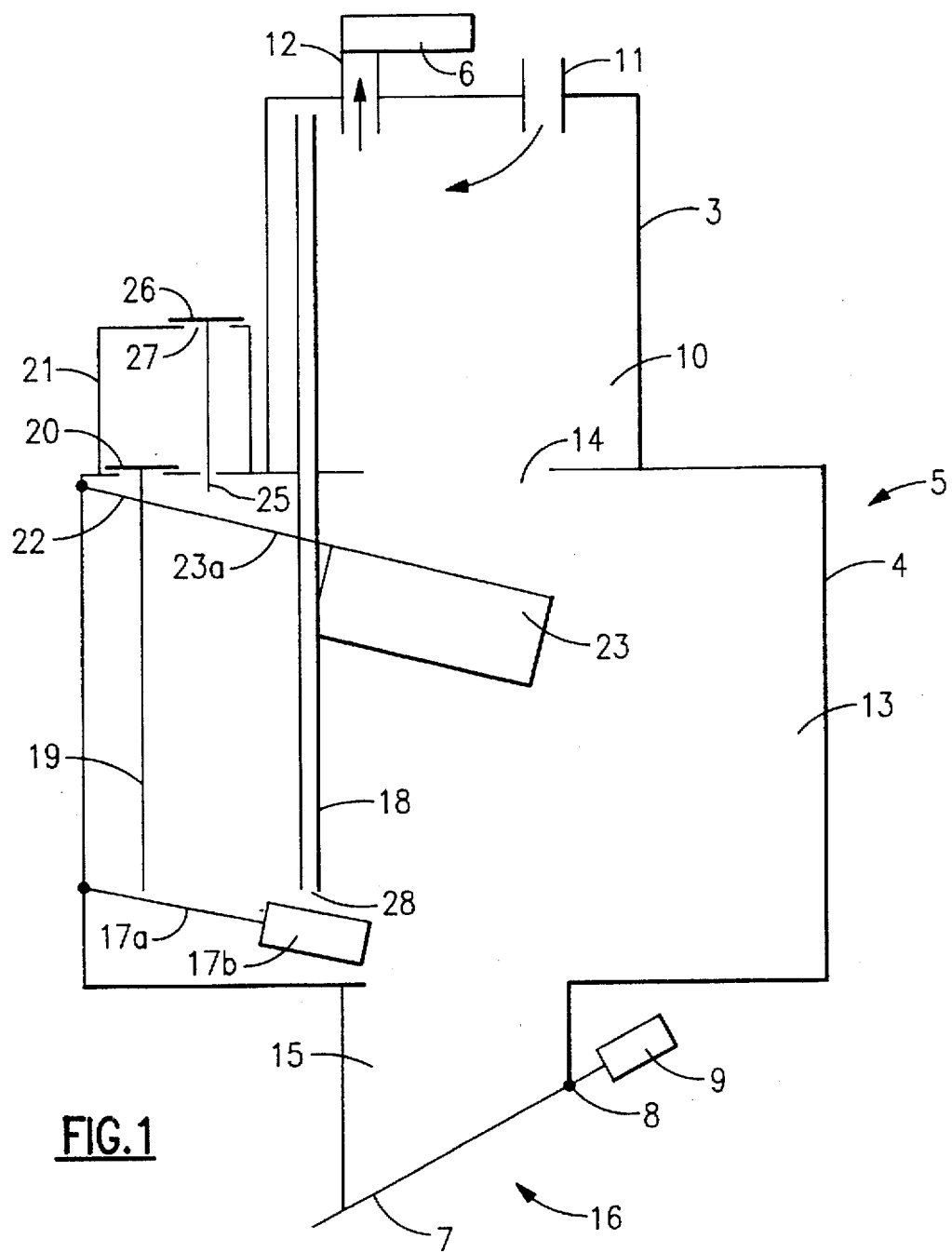
FIG. 1 is a schematic view of a liquid flow control apparatus according to the present invention.

Referring to FIG. 1, there is shown schematically a liquid flow control apparatus 5 according to the present invention. The liquid flow control apparatus 5 will be described hereinafter in relation to the control of flow of milk but it can, of course, be used to control the flow of other liquids.

Milk from a milking machine (not shown) enters a first chamber 10 formed by walls 3 of the apparatus 5 via an inlet 11. The chamber has an outlet 12 which is connected to a vacuum pump 6 so that the chamber 10 is under reduced pressure, i.e., less than atmospheric pressure. The effect of this reduced pressure acts to cause milk to flow from the milking machine through the inlet 11 into the chamber 10. The chamber 10 is in fluid communication with a chamber 13 by way of an opening 14. The chamber 13 is formed by walls 4 and has an outlet 15 which is normally closed by a flapper valve 16. The flapper valve 16 is preferably constructed of an arm 7, a hinge 8, and a counterweight 9.

Figure 2:
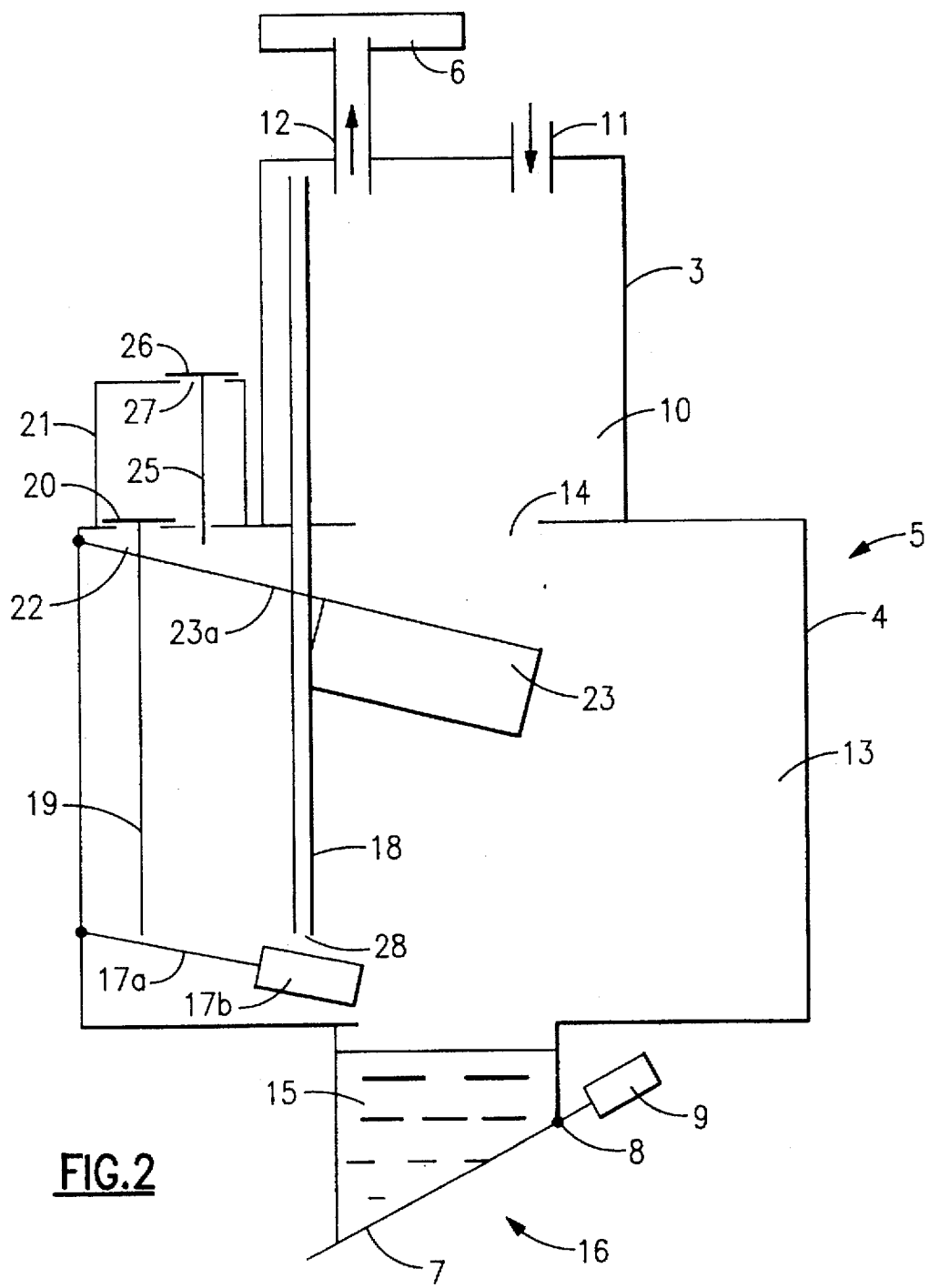
FIG. 2 is a schematic view of the liquid flow control apparatus of the present invention with the milk entering the first chamber of the apparatus.
Figure 3:
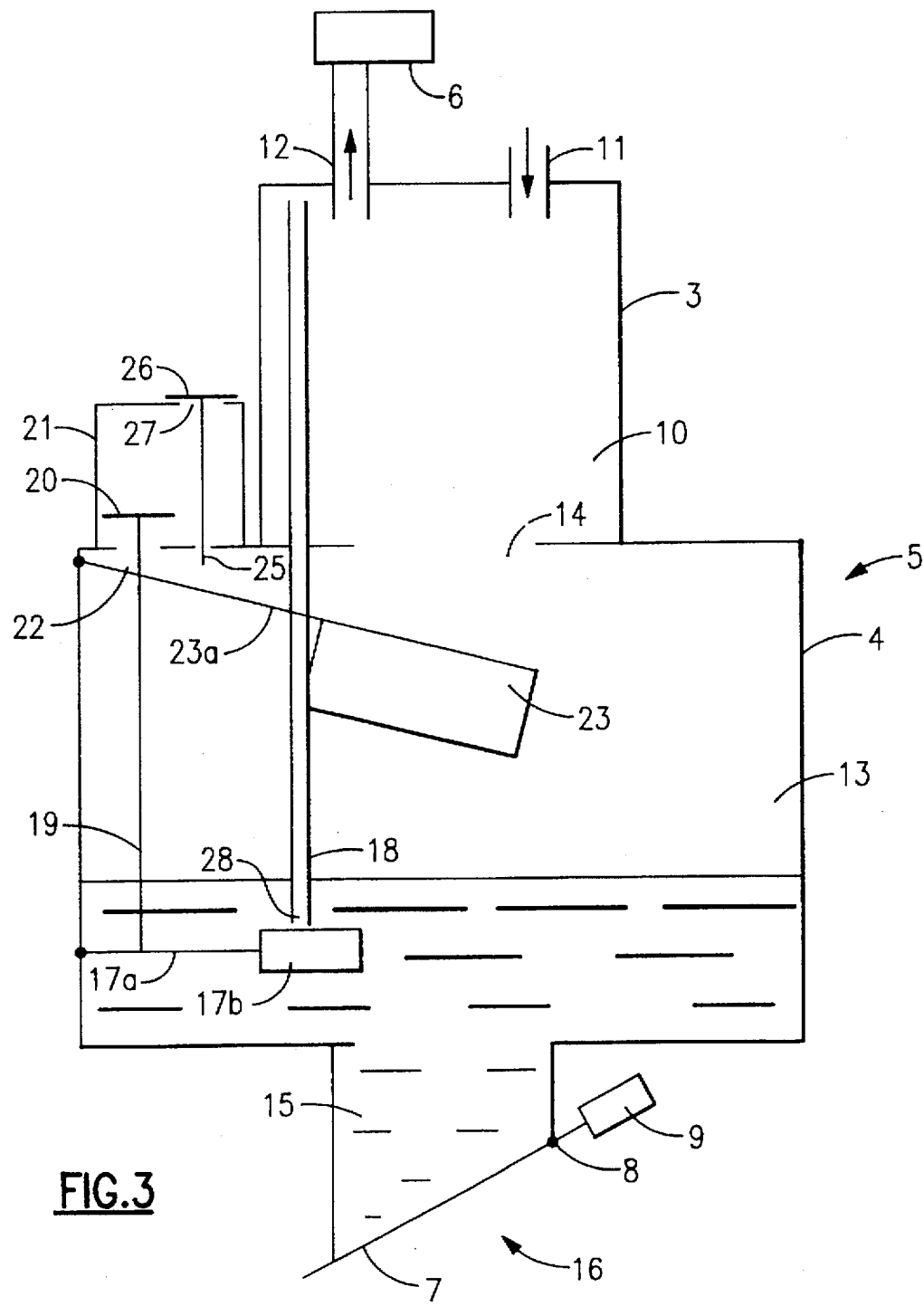
FIG. 3 is a schematic view of the liquid flow control apparatus of the present invention where the level of the milk in the first chamber has risen in the first chamber enough to lift the lower float and close off the vacuum conduit tube between the first and second chamber.
Figure 3A:
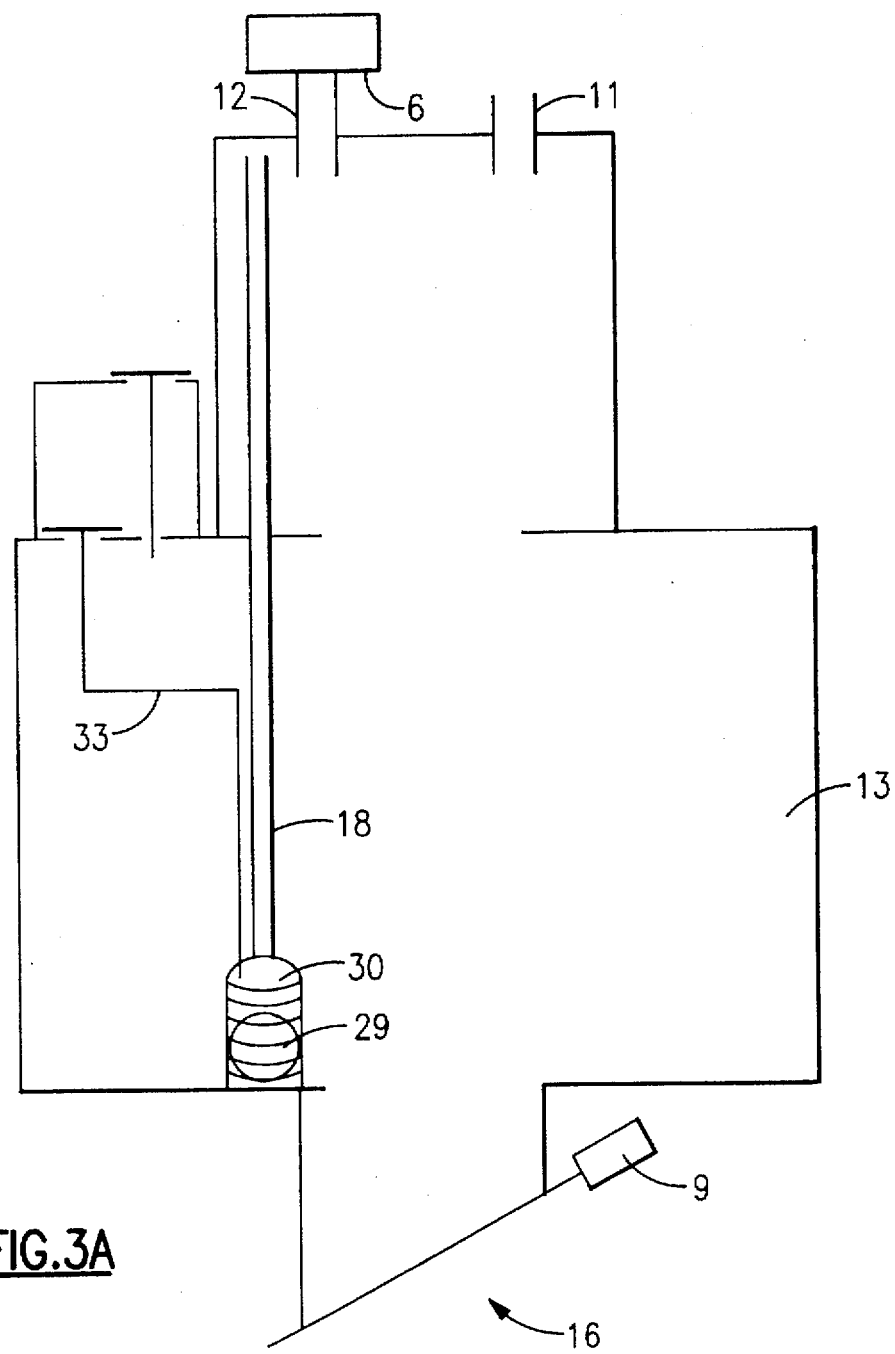
FIG. 3a is a schematic partial view of the liquid flow control apparatus of the present invention with a floating ball valve located below the conduit tube.

FIG. 2 shows an initial condition in which milk flows from the inlet 11 through the chamber 10 and begins to fill the chamber 13, starting at the outlet 15. The valve 16 does not open due to the reduced pressure in the chambers 10 and 13. Turning to FIG. 3, as the level of milk in the chamber 13 begins to rise, a float 17b rises to close the opening 28 of a conduit tube 18 which extends between the chamber 10 and the chamber 13. As the float 17b rises, an arm 17a extending therefrom contacts a stem 19 of a poppet valve 20 causing the valve 20 to open so that a third chamber 21 is placed in communication with the chamber 13 via a port 22. The float 17b is pivotally connected to the wall 4 of the chamber 13. The float 17b could be guided in a variety of ways including substituting a ball float 29 located inside a tube 30 located below the conduit tube 18 as shown in FIG. 3a. The change to the ball float 29 would require a different stem 33 that ensures that the ball float 29 would contact the stem upon rising.

Figure 3B:
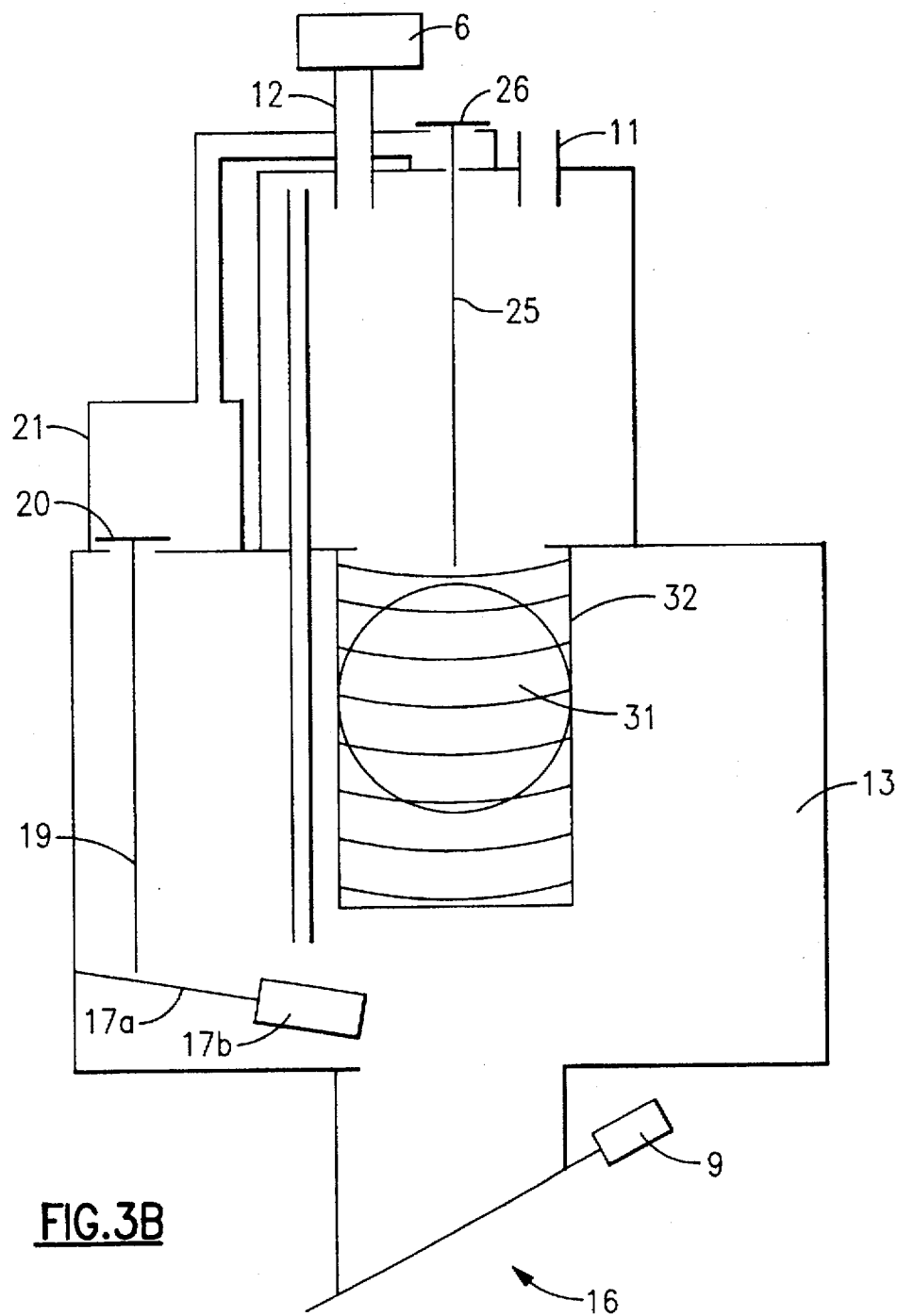
FIG. 3b is a schematic view of the liquid flow control apparatus of the present invention with a floating ball valve located between the opening of the first and second chambers.
Figure 4:
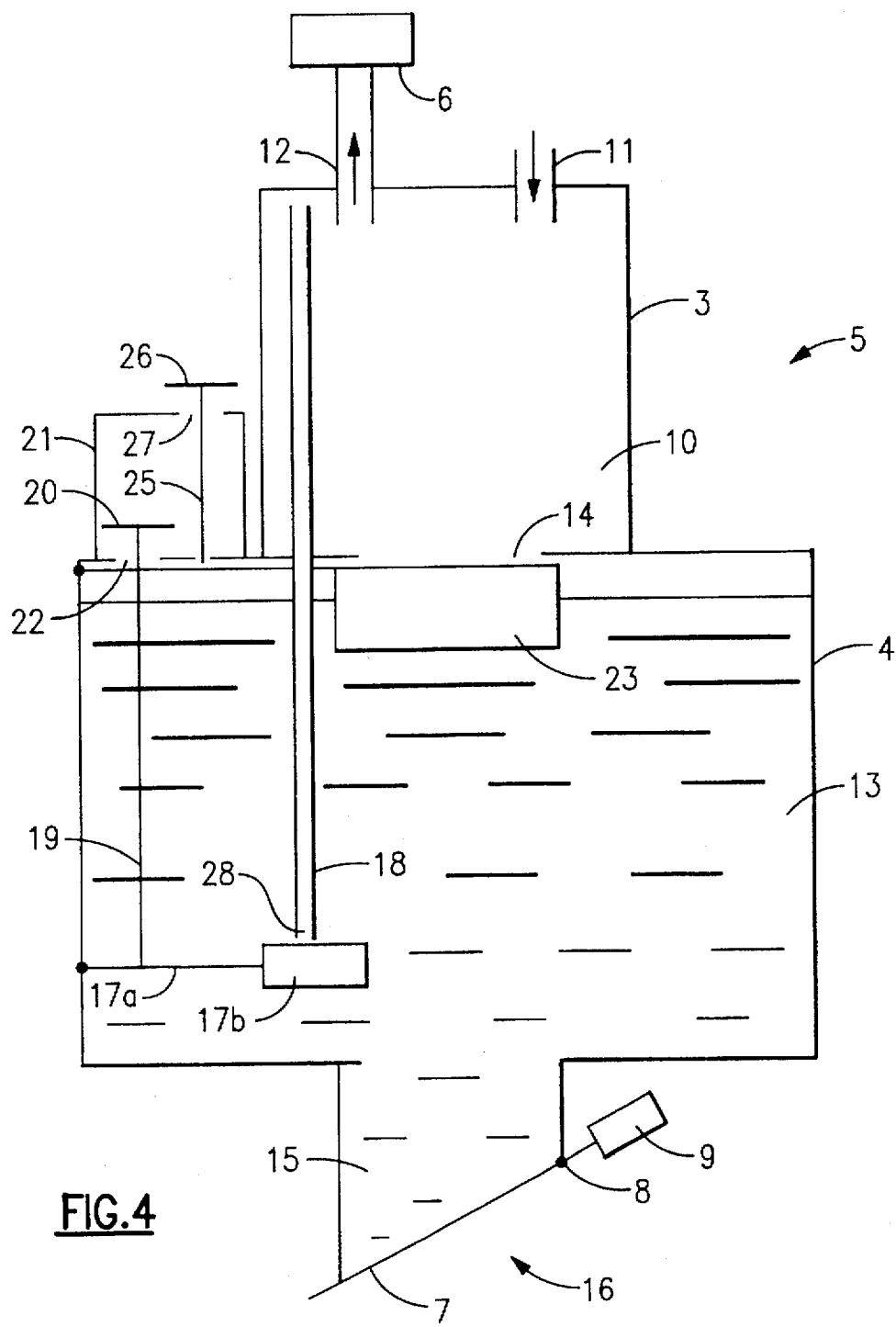
FIG. 4 is a schematic view of the liquid flow control apparatus of the present invention where the level of the milk in the first chamber has risen to the point where the top float valve closes off communication between the first and second chamber and opens the second poppet valve that is positioned on the third chamber to the atmosphere.
Figure 5:
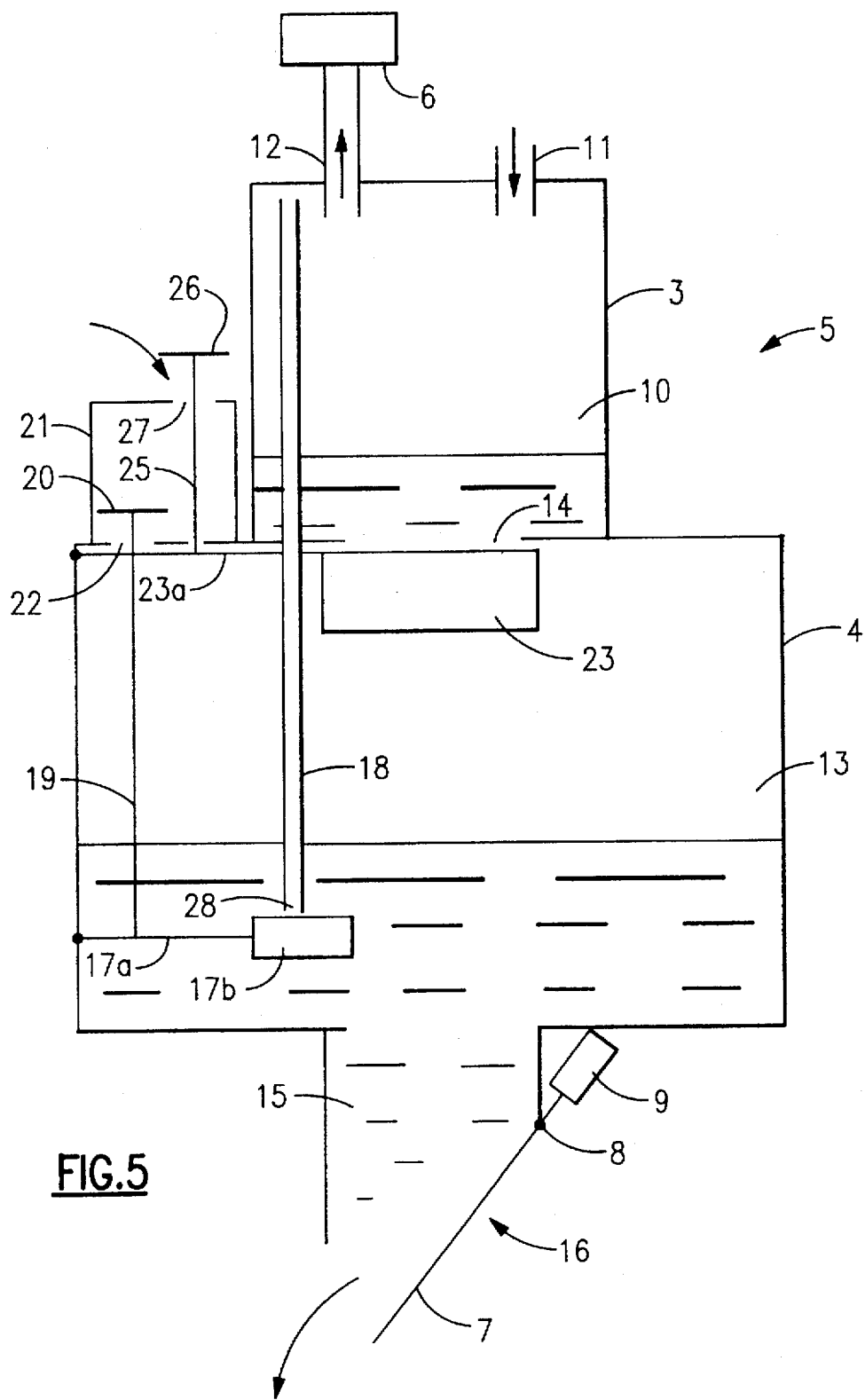
FIG. 5 is a schematic view of the liquid flow control apparatus of the present invention where the opening of the second chamber to atmospheric pressure causes the weight of the milk to open the flapper valve at the outlet to the second chamber to release the milk from the second chamber; and, FIG. 6 is a schematic view of the liquid flow control apparatus of the present invention where the level of milk in the first chamber has fallen to a level where the second chamber is once again closed off from communication with the third chamber, and the first chamber is in communication with the second chamber via the conduit tube between the two chambers.

The chamber 13 has a float 23 located therein. The float 23 is pivotally connected to the wall 4 of the chamber 13. The float 23 could be guided in a variety of ways including substituting a ball float 31 located inside a tube 32 located below the opening between chamber 10 and chamber 13 as shown in FIG. 3b. The stem 25 and the valve 26 are positioned above the chamber 10 in order that the ball valve 31 contacts the stem 25 to open the valve. As shown in FIG. 4, the float 23 rises rapidly and seals against the opening 14, thus closing the opening and preventing communication between the chamber 10 and the chamber 13. As the float 23 rises, an arm 23a extending therefrom contacts a stem 25 of a poppet valve 26 causing the valve 26 to open an outlet port 27 in the third chamber 21. The third chamber 21 is thus placed in communication with the atmosphere and, since the valve 20 is still open, the chamber 13 will be at atmospheric pressure. As shown in FIG. 5, once the chamber 13 is at atmospheric pressure, the weight of milk therein is sufficient to cause the flapper valve 16 to open, so that the milk from the chamber 13 passes to a refrigerated milk storage tank (not shown) or any other vessel used for further handling of the milk. The float 23, however, does not fall and continues to maintain the opening 14 closed because of the differential pressure between the chambers 10 and 13. While the opening 14 is closed, milk continues to enter the chamber 10 through the inlet 11.

Figure 6:
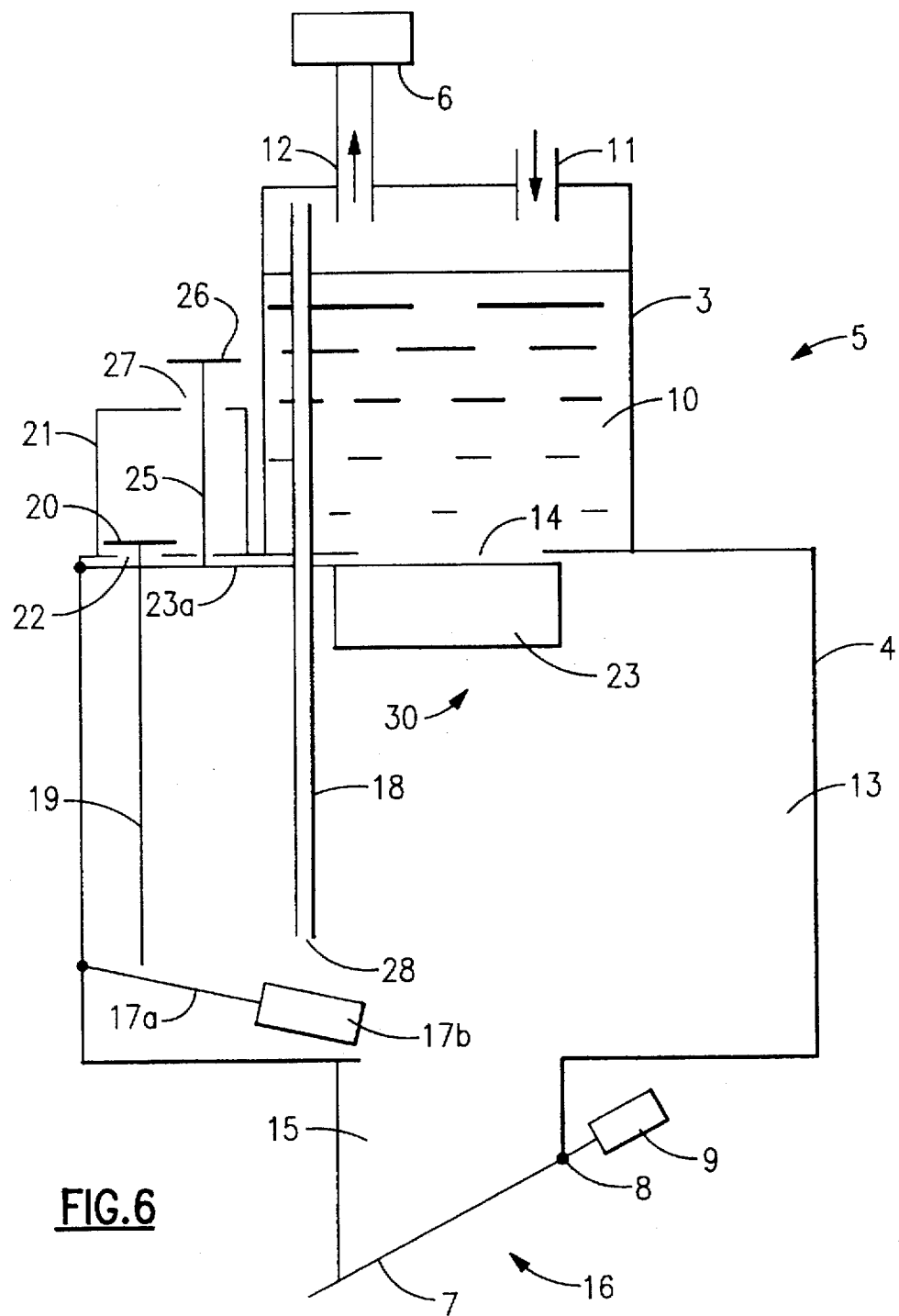

Turning to FIG. 6, when the level of milk in the chamber 10 falls to a given level, the float 17b ceases to close the lower end of the conduit 18. The valve 20 closes the ports 22 in the third chamber 21 since the valve 20 is no longer kept open by the float 17b via the arm 17a and the stem 19. When all the milk that was in the chamber 13 has passed through the outlet 15, the flap valve 16 closes since it is counterweighted to the closed position, and the pressure in the chamber 13 falls because air is withdrawn therefrom via the conduit 18, the chamber 10 and the outlet 12. The reduced pressure in chamber 13 causes flap 16 to close tightly.

Once the chambers 10 and 13 are at roughly the same reduced pressure, the float 23 falls. As the float 23 falls, the valve 26 closes against the opening 27 since it is no longer kept open by the float 23 via the arm 23a and the stem 25. The opening 14 is no longer closed by the float 23 and the milk in the chamber 10 enters the chamber 13.

With communication open between chambers 10 and 13 via the conduit tube and the opening 14, the pressure between the two chambers equalizes, and the above described cycle of operation is then repeated.

It will be appreciated that each cycle of the milk flow control apparatus causes a predetermined quantity of milk to pass through the outlet 15. This predetermined quantity being essentially equal to the volume of the chamber 13 (see FIG. 4). Accordingly, the addition of a counter would allow the total quantity of milk to be measured. It will be appreciated that the chamber 21 may be incorporated into the chamber 13 for ease of construction.

Accordingly, the present invention eliminates the need for a pump to extract liquid from a reduced pressure collecting vessel. In so doing, the present invention replaces the pump with a mechanical device that is simple and reliable and does not require expensive valves and controls. Also, the present invention allows for gentler handling of the milk which helps to reduce lypolysis.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A liquid flow control apparatus, comprising:
   a) walls defining a first chamber having a liquid inlet, an air outlet, and a liquid outlet so that the first chamber may be subjected to a pressure which is less than atmospheric pressure;
   b) walls defining a second chamber having an inlet in communication with the first chamber, and having an outlet;
   c) first valve means for closing communication between the first and second chambers when a predetermined amount of liquid has flowed from the first chamber to the second chamber;
   d) second valve means for connecting the second chamber to the atmosphere so that the liquid can flow through the outlet of the second chamber;
   e) third valve means for opening and closing the flow of liquid through the outlet of the second chamber;
   f) a conduit tube establishing air communication between the first chamber and the second chamber;
   g) fourth valve means for opening and closing air communication through the conduit tube; and,
   h) air conveying means for creating a reduced pressure inside a chamber, the air conveying means attached to the air outlet on the first chamber,
   whereby liquid can enter the second chamber until the fourth valve means closes air communication between the first and second chamber via the conduit tube, the first valve means closes communication of fluid between the first and second chamber, and the second valve means opens to atmosphere, thereby allowing fluid to exit from the second chamber through the third valve means due to its weight while the air conveying means continues to pull liquid into the first chamber, the exiting of the fluid from the second chamber reopening the fourth valve means to reestablish air communication between the first and second chamber thereby equalizing the pressures between the first and second chamber and allowing the first valve means to open the liquid communication between the first and second chamber to resume the flow of liquid from the first chamber to the second chamber.

2. The liquid flow control apparatus of claim 1, wherein the first valve means comprises first float means for closing communication between the first and second chamber when the liquid in the second chamber reaches the predetermined level.

3. A flow control apparatus for a liquid, the liquid being conveyed to the apparatus by a vacuum creating means, the flow control apparatus comprising:
   a) walls defining a first chamber having a liquid inlet, a liquid outlet, and an air outlet connected to the vacuum creating means;
   b) walls defining a second chamber in communication with the first chamber, the second chamber having a liquid outlet and an air inlet;
   c) a flapper valve connected to the outlet of the second chamber;
   d) a conduit tube having an opening at each end and extending from the first chamber to the second chamber to establish communication therebetween;
   e) a first float located in the second chamber and sized to fit over the liquid outlet of the first chamber so as to reversibly close communication between the first and second chamber, the first float closing communication between the first chamber and the second chamber when the liquid reaches a predetermined level in the second chamber;
   f) a second float located in the second chamber, the float positioned below the conduit tube such that when the liquid rises to a predetermined level in the second chamber the second float covers the opening of the conduit tube so as to close off communication between the first and second chamber; and,
   g) a valve between the air inlet of the second chamber and the atmosphere, the valve having a stem extending inside the second chamber, the stem being operable to open and close the valve, the stem positioned adjacent to the second float such that when the liquid rises in the second chamber the second float will contact the stem and will exert a force against the stem to open the valve,
   whereby liquid can enter the second chamber until the second float closes air communication between the first and second chamber via the conduit tube, the first float closes communication of fluid between the first and second chamber, and the valve in the second chamber opens to atmosphere, thereby allowing fluid to exit from the second chamber due to its weight through the flapper valve while the vacuum means continues to pull liquid into the first chamber, the exiting of the fluid from the second chamber causing the second float to drop causing air communication to be reestablished between the first and second chamber thereby equalizing the pressures between the first and second chamber and allowing the first float to open the liquid communication between the first and second chamber to resume the flow of liquid from the first chamber to the second chamber.

4. The flow control apparatus of claim 3, wherein the first float is a ball float.

5. The flow control apparatus of claim 4, further comprising a tubular member attached to the wall of the second chamber, the tubular member surrounding the ball float.

6. The flow control apparatus of claim 3, wherein the first float has an arm extending therefrom, the arm being pivotally connected to the wall of the second chamber.

7. The flow control apparatus of claim 3, wherein the second float has an arm, the arm being pivotally connected to the wall of the second chamber.

8. The flow control apparatus of claim 3, wherein the second float is a ball float.

9. The flow control apparatus of claim 8, further comprising a tubular member attached to the wall of the second chamber, the tubular member surrounding the ball float.

10. A flow control apparatus for a liquid, the liquid being conveyed to the apparatus by a vacuum creating means, the flow control apparatus comprising:

a) walls defining a first chamber having a liquid inlet, a liquid outlet, and an air outlet connected to the vacuum creating means;

b) walls defining a second chamber in communication with the first chamber, the second chamber having an outlet;

c) walls defining a third chamber having a first port in communication with the second chamber and a second port open to the atmosphere;

d) a flapper valve connected to the outlet of the second chamber;

e) a conduit tube extending from the first chamber to the second chamber to establish communication therebetween;

f) a first float located in the second chamber and sized to close off communication between the first chamber and the second chamber by closing the liquid outlet of the first chamber;

g) a valve positioned in the second port to open and close communication between the third chamber and the atmosphere, the valve having a stem extending inside the second chamber, the stem being operable to open and close the valve and positioned such that when the liquid lifts the first float the first float will contact the stem and will exert a force against the stem to open the valve;

h) a second float located in the second chamber, the second float positioned below the conduit tube such that when the liquid rises to a predetermined level in the second chamber the second float closes off the conduit tube; and i) a valve positioned in the first port between the second chamber and the third chamber, the valve having a stem extending inside the second chamber, the stem being operable to open and close the valve, the stem positioned adjacent to the arm on the second float such that when the liquid rises the first float will come in contact with the stem and will exert a force against the stem to open the valve, whereby liquid can enter the second chamber until the second float closes air communication between the first and second chamber via the conduit tube, the first float closes communication of fluid between the first and second chamber, and the port in the third chamber opens to atmosphere, thereby allowing fluid to exit from the second chamber due to its weight through the flapper valve while the vacuum means continues to pull liquid into the first chamber, the exiting of the fluid from the second chamber causing the second float to drop causing air communication to be reestablished between the first and second chamber thereby equalizing the pressures between the first and second chamber and allowing the first float to open the liquid communication between the first and second chamber to resume the flow of liquid from the first chamber to the second chamber.

11. The flow control apparatus of claim 10, wherein the first float is a ball float.

12. The flow control apparatus of claim 11, further comprising a tubular member attached to the wall of the second chamber, the tubular member surrounding the ball float.

13. The flow control apparatus of claim 10, wherein the second float is a ball float.

14. The flow control apparatus of claim 13, further comprising a tubular member attached to the wall of the second chamber, the tubular member surrounding the ball float.

15. The flow control apparatus of claim 10, wherein the first float has an arm extending therefrom, the arm being pivotally connected to the wall of the second chamber.

16. The flow control apparatus of claim 10, wherein the second float has an arm, the arm being pivotally connected to the wall of the second chamber.

17. The flow control apparatus of claim 10, wherein the valve positioned in the second port is a poppet valve.

18. The flow control apparatus of claim 10, wherein the valve positioned in the first port is a poppet valve.

* * * * *